March 6, 1951

G. B. WOOTTEN 2,543,949

OPHTHALMIC LENS

Filed Nov. 4, 1949

Inventor
GEORGE B. WOOTTEN
By: Fetherstonhaugh & Co.
Att'ys

March 6, 1951 G. B. WOOTTEN 2,543,949
OPHTHALMIC LENS
Filed Nov. 4, 1949 4 Sheets-Sheet 3

Inventor
GEORGE B. WOOTTEN
By: Fetherstonhaugh & Co.
Att'ys

Patented Mar. 6, 1951

2,543,949

UNITED STATES PATENT OFFICE 2,543,949

OPHTHALMIC LENS

George Bates Wootten, Sudbury, Ontario, Canada

Application November 4, 1949, Serial No. 125,532

13 Claims. (Cl. 88—54)

This invention relates to an ophthalmic lens of novel type herein referred to as a lens of "minimal deviation" which is constructed in accordance with the principle of minimum deviation but wherein such may embody zero deviation.

This application forms a continuation in part of my application Serial No. 721,524 filed January 11, 1947, now abandoned.

According to the invention, if the problem of refraction through any zone of a lens is reduced to its simplest terms it appears that the ultimate in lens form must be based upon a criterion of the best disposition of each zone in relation to the refracted rays. As the eye rotates to regard objects through various zones of a lens, it is concerned at any one time with only a small pencil of light rays hereinafter referred to as "sight rays." For purposes of definition the term "principal sight ray" as used herein refers to a particular sight ray coming from the point of regard and which is directed by the lens to the eye along its visual axis. By disposing each elemental prism or lens zone of a lens in a position of minimum deviation, the various aberrations accounted for in ophthalmic lenses are reduced to minimal amounts. The term "minimum deviation" as used herein embodies the generally accepted meaning as applied to a prism which is so placed that incident and emergent rays make equal angles with the normals at their respective surfaces with a minimum degree of deviation.

Having regard to a criterion of minimum deviation in all zones of a lens, it is notable that a special case would involve a lens of zero deviation wherein the lens form would comprise concentric front and rear surfaces. I have found that a lens of this particular type approaches a practical form when of a power of about minus 1 dioptre. I call such a lens a "reference lens" since in deriving a series of lenses of the same general form for other powers but adhering to the criterion of minimum deviation, dimensions of a specific lens are derived from the reference lens form.

The lens of the invention may therefore embody "minimum deviation" of a sight ray or "zero deviation" of such ray, wherefore to avoid confusion, and having regard to the general principles involved herein I term such embodiment broadly a "minimal deviation" lens since such sight ray may suffer either minimum or zero deviation according to lens form taught hereinafter in more detail. Therefore it will be understood that my criterion or principle stated as minimal deviation may embody both of these noted prior principles as applied to prisms.

It has been found that in selecting a reference lens which will be close to minus 1 power, the rear surface vertex distance from the centre of ocular rotation is set as equal to the radius of the rear surface where the front surface is concentric therewith. These various factors will determine the lens form of the reference lens which will operate at zero deviation. All other lenses of a series derived from a reference lens and known herein as "related lenses" are modified only in accordance with the criterion of minimum deviation but preferably in the following manner: The front surface curvature is set as constant for all lens powers above a value corresponding to the minimum practical lens thickness to be explained hereinafter in more detail. Above this reference power the lens thickness is varied in accordance with the values imposed by the rear surface curvature in turn determined by a minimum deviation condition for sight rays. Below this power value referred to, the thickness is kept constant and the front and rear surface radii are modified as hereinafter more fully illustrated in detail.

At once a distinct advantage accrues in that it is possible to employ a single lens blank form for a number of lenses in any one series extending from approximately minus 4.5 dioptres up to and past plus 10 dioptres if desired, by reason of a single value of front surface curvature. This provides a distinctive saving to a lens manufacturer.

With the above and other objects hereinafter set forth, the invention generally comprises an ophthalmic lens having a finished front surface and a finished rear surface defining a lens body in which the front and rear surfaces of any elementary zone thereof make equal angles respectively with incident and emergent components of a sight ray passing therethrough to obtain minimal deviation of the said sight ray. The rear surface of the lens body is disposed a predetermined distance from the centre of ocular rotation such that the emergent component of the sight ray of minimal deviation intersects the principal axis of the lens within a section of the said axis defined by the points of intersection of the radii of curvature of the surfaces thereof. In the special case of the reference lens the deviation condition will be zero for all zones and the concentric point of the lens surfaces will be at the centre of ocular rotation.

Other objects of the invention will be appreciated by a study of the following specification taken in conjunction with the accompanying drawings.

In the drawings,

Figure 1 is a schematic illustration representing the derivation of related lenses of a lens series from a reference lens of chosen form.

Figure 2 is a chart embodying curves of front surface curvature, lens thickness, and emergent ray departure from the centre of ocular rotation on a lens power base for lenses derived from a reference lens of minus 1 dioptre having its rear vertex spaced 25.5 mm. from the centre of ocular rotation and having a front surface of 19 dioptres down to a minus 4.5 dioptre lens.

Figure 1:
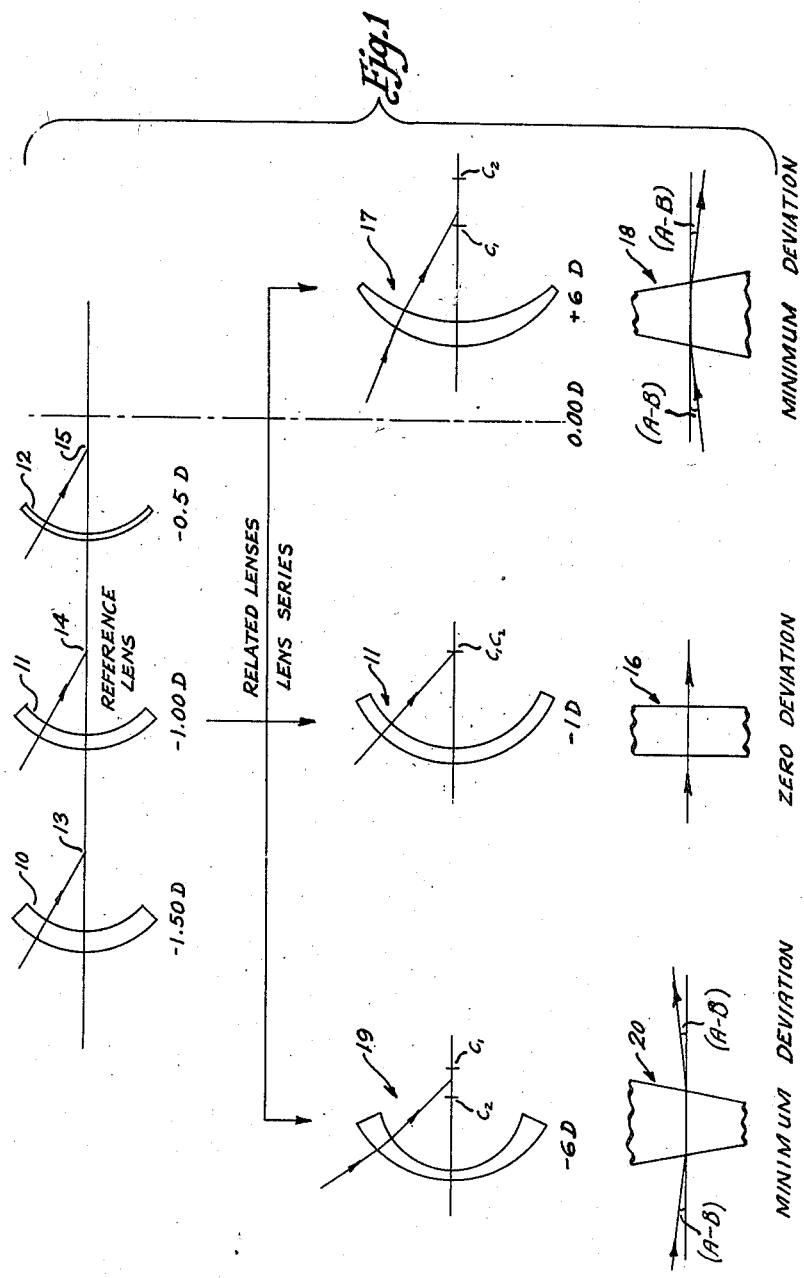

Referring now in detail to the drawings and particularly to Figure 1 which is representative only, it will be observed reference lenses 10, 11 and 12 are shown of different powers and which have front and rear surfaces concentric with a point 13, 14 and 15 respectively, which according to the invention is located at the centre of ocular rotation. From the drawing it will be apparent that as reference lenses of greater minus power are chosen they will become thicker and the thickness will be reduced to zero at zero power. For purposes of illustration herein, it is assumed that a minus 1 dioptre lens of front and rear concentric surfaces will have a form which is suitable assuming a rear surface vertex distance of 25.5 mm. The thickness will be found to be 2 mm.

Having decided upon the general lens form, a lens series having "minimal deviation" may be derived and any one related lens determined having regard to a criterion of minimum deviation. At the minus 1 dioptre power the front and rear surfaces will be concentric and in any elementary zone thereof will be parallel as illustrated by lens sections 16. As the lens form is modified according to the criterion of minimum deviation toward the plus end of the scale, it is modified to the characteristics represented by the lens form 17 wherein each zonal portion of the lens accommodates a sight ray in the manner indicated at 18. In the direction of the more minus powers from the reference lens, the lens body becomes thicker at its ends as indicated by the lens form 19 having zonal sections of the type indicated at 20.

Figure 2:
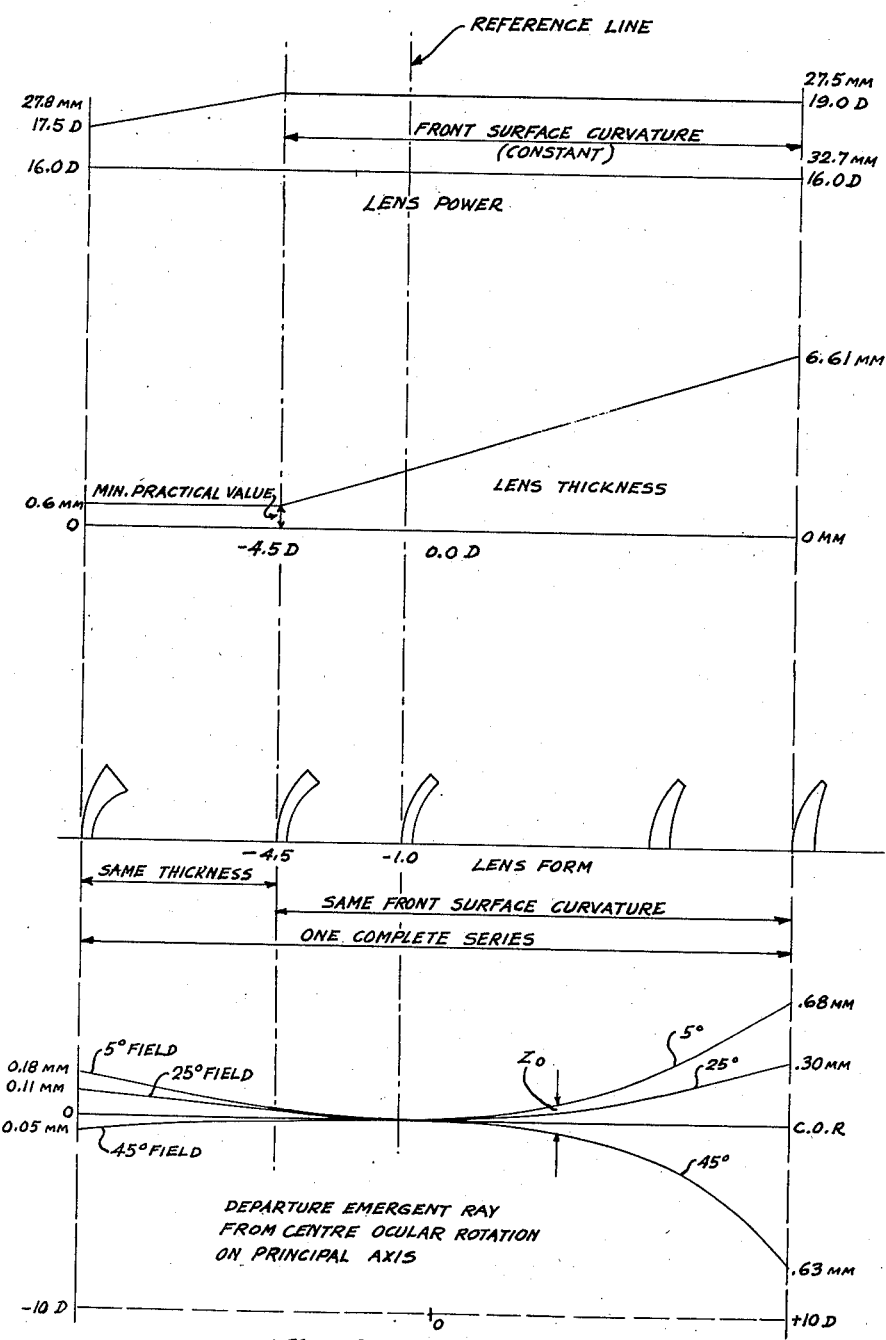

Assuming specifications for a reference lens form such that the front surface curvature is 19 dioptres and the rear surface vertex distance is 25.5 mm. from the centre of ocular rotation, then the lens form throughout a series is predictable from Figure 2 which is, of course, representative only of actual curves. According to the invention, front surface curvature preferably is kept at a constant value over a substantial range of powers extending in this case from minus 4.5 dioptres to plus 10 dioptres. Below the value of minus 4.5 dioptres the lens thickness at the vertex would become impractical and therefore, it is desirable to set the vertex thickness as a constant factor down to minus 10 dioptres. Representative lens forms of related lenses are shown on a lens base in this figure, the lowermost set of curves illustrating the departure of the intersecting point of an emergent sight ray of minimum deviation with the principal axis from the centre of ocular rotation. According to the invention all lenses of any one series will have the same rear surface vertex distance measured along the principal axis to the centre of ocular rotation. These curves will be referred to in more detail hereinafter.

Table I following sets forth values of vertex thickness, front surface power, and rear surface distance from the centre of ocular rotation for a complete lens series for each power from plus 10 to minus 10 dioptres, so that the scope of lens form herein set out will be more readily appreciated by skilled persons.

Table I

| Lens Power | Front Surface Power | Rear Surface Power | Vertex Thickness | Rear Surface Vertex Distance from Centre of Ocular Rotation |
|---|---|---|---|---|
| Dioptres | Dioptres | Dioptres | Mm. | Mm. |
| −10.00 | +17.620 | −27.744 | 0.6 | 25.5 |
| −8.00 | +18.125 | −26.256 | 0.6 | 25.5 |
| −6.00 | +18.640 | −24.791 | 0.6 | 25.5 |
| −4.50 | +19.025 | −23.670 | 0.6 | 25.5 |
| −2.00 | +19.025 | −21.413 | 1.6 | 25.5 |
| −1.00 | +19.025 | −20.518 | 2.0 | 25.5 |
| +2.00 | +19.025 | −17.818 | 3.2 | 25.5 |
| +4.00 | +19.025 | −16.026 | 4.0 | 25.5 |
| +7.00 | +19.025 | −13.347 | 5.2 | 25.5 |
| +10.00 | +19.025 | −10.680 | 6.4 | 25.5 |

Having reviewed the derivation of lens form generally from a reference lens it is now pertinent to detail the factors involved in such derivation. It seems apparent that certain factors have been overlooked in prior proposals in the reduction of astigmatic aberrations in ophthalmic lenses, namely, facts pertaining to the principle of minimum deviation as it may be applied to ophthalmic lenses and set out in more detail hereinafter.

In present proposals account is taken of the fact that only a very small pencil of slight rays falls directly along the visual axis at any time and that, therefore, this pencil of sight rays may be regarded for purposes of calculation, as being a single ray termed herein a "principal ray." It is a general law of optics that when any quantity is passing through its minimum value, a small change in the variable concerned produces very little effect upon the magnitude of the quantity itself. For example, deviation of rays through a prism depends upon the path of the rays but when the prism is in the position of minimum deviation any small change in the path of the rays produces but little change in the magnitude of the deviation.

Therefore, when considering rays passing through a prism by paths near to that of minimum deviation, it will be apparent that the deviation which each undergoes is practically the same and very nearly equal to the minimum value. Thus it is consistent with the general law set forth to consider that all rays of a small pencil will be deviated to an approximately equal extent where the principal ray passes along a path of minimum deviation. While this application of the law applies to a plain prism it will be appreciated that small pencils of sight rays may be refracted substantially at the angle of minimum deviation for each zone of the lens when suitable lens form is employed. The related lens forms of this invention are based on this concept.

Figure 3:
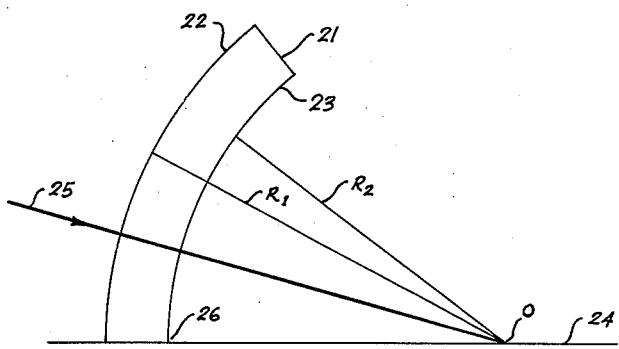
Figure 3 is a diagrammatic view of a reference lens having zero deviation.

Now referring to the drawings and particularly Figure 3 a reference lens 21 is illustrated having a front surface 22 and a rear surface 23 with radii $R_1$ and $R_2$ respectively scribed concentrically from the common point O located on the principal axis 24. The point O is, according to the invention, positioned at the centre of ocular rotation. A principal ray 25 is shown passing through the lens by a path of "minimal deviation" being in this case zero deviation, to meet the principal axis 24 at the point O. It will be appreciated that in consideration of ophthalmic lenses being the only type considered herein, a discussion of any other rays is irrelevant. The concentric lens in Figure 3 is of the reference lens type. This lens form has uniform thickness throughout. For an assumed distance of 25.5 mm. (preferred herein) between the point O and the rear surface vertex 26, a reference lens of minus power is exemplified. For purposes of illustration, a lens of minus 1.00 D proportions is illustrated.

Related lenses of lower minus refractive power according to these proposals present the uncommon case of concavo-convex minus lenses wherein the centre thickness is greater than the edge thickness. A lens of higher minus power with substantially reduced edge thickness as compared with conventional lens forms would therefore be feasible, giving a feature greatly appreciated by myopes. Obviously lenses designed to be used for safety purposes may be much thicker than the thickness allowance of 0.5 dioptre in the reference lens suggested herein for the more common lens prescription. Safety lenses may also be placed farther from the eyes. These factors would affect the reference lens to give a somewhat shallower form and a front surface curvature of longer radius. It is, therefore, feasible to have different reference lenses according to the general form desired, as follows:

Table II

| Lens Power | Radius of Front Surface | Radius of Rear Surface | Thickness Allowance | Rear Surface Vertex Distance |
| --- | --- | --- | --- | --- |
| | Mm. | Mm. | | Mm. |
| -1.0 | 27.5 | 25.5 | (2 mm.) 0.5 D | 25.5 |
| -1.6 | 28.6 | 25.4 | (3.2 mm.) 0.75 D | 25.4 |
| -1.6 | 29.9 | 26.3 | (3.6 mm.) 0.75 D | 26.3 |

Thus for these different lens forms in the reference lens, the front surface curvature is established which may be kept through a substantial portion of a series of related lenses until thickness limitations require a modification.

However, while the distance between the rear surface vertex of the lens and the centre of ocular rotation of the wearer are governed by factors which will vary in practical application between limits of 24.4 mm. and 27.0 mm., it is necessary also to specify limitations of front surface variations for lenses of different powers.

According to the invention it is necessary to keep front surface radii of curvature within certain limits. For a lens of minus 1.00 D power these limits are between 26.4 mm. and 29.0 mm. Translated into terms of front surface plus power these would read 19.8 D and 18.0 D respectively for a minus 1.00 D lens. Table III shows a variety of useful front surface plus powers for each of a series of specimen lenses over a range of lens powers most frequently used in practice.

Table III

| Lens Power, in Dioptres | Front Surface Power Limits, in Dioptres |
| --- | --- |
| minus 6.00 | plus 17.0 to 18.8 |
| minus 5.00 | plus 17.0 to 19.2 |
| minus 4.00 | plus 17.5 to 19.6 |
| minus 3.00 | plus 17.6 to 19.6 |
| minus 2.00 | plus 17.8 to 19.8 |
| minus 1.00 | plus 18.0 to 19.8 |
| minus 0.00 | plus 18.2 to 19.8 |
| plus 1.00 | plus 18.2 to 19.0 |
| plus 2.00 | plus 18.2 to 19.0 |
| plus 3.00 | plus 18.2 to 19.0 |
| plus 4.00 | plus 18.1 to 19.0 |
| plus 5.00 | plus 18.0 to 19.0 |

The term "lenses of the minimal deviation type" is thus considered to embody both reference and related lenses, the most practical of which fall within the scope of Table III.

Figure 4:
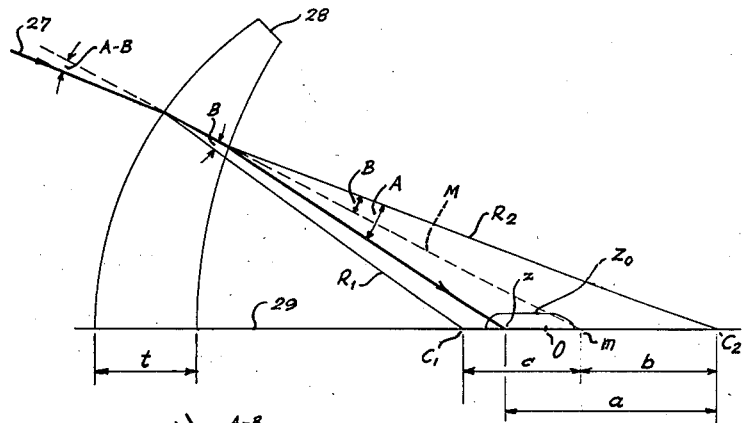
Figure 4 is a diagrammatic view of a convex lens section having minimum deviation characteristics according to the invention.
Figure 5:
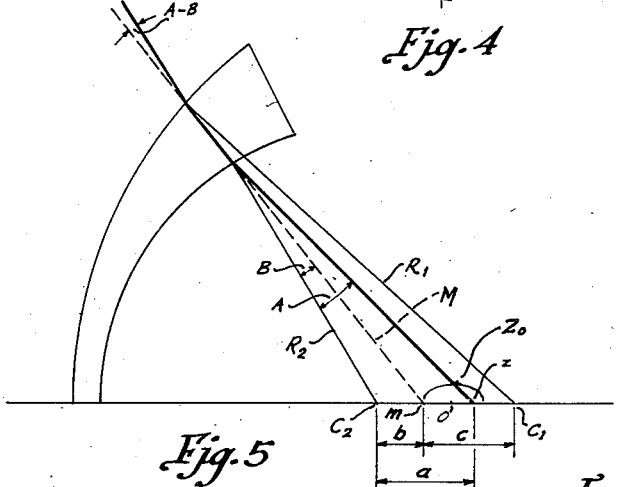
Figure 5 is a similar diagram for a concave lens.

For a discussion of the theory of the function of related lenses reference is now made to Figures 4 and 5. A ray 27 is shown being transmitted by the lens in a position of minimum deviation. That part of the ray within the body of the lens may have a theoretical projection M intersecting the principal axis at a point $m$. It has been found by mathematical analysis that, for lenses bounded by one concave and one convex surface, the point $m$ is common to all such aforesaid projections from all zones of the lens. The location of this fixed point $m$ divides the line (joining the centres of surface curvatures), section $C_1C_2$, internally in the ratio $$\frac{c}{b} = \frac{R_1}{R_2} \qquad (1)$$

wherein $c$ is the segment $C_1m$, $b$ is the segment $mC_2$, and $R_1$ and $R_2$ are the radii of front and rear surface curvatures respectively.

A ray of "minimal deviation" in this case more precisely one of minimum deviation, upon emergence from the lens body, is refracted to cross the axis of the lens at a point $z$ which is away from the point $m$ in the direction of $C_1$ but never so far as $C_1$. If the distance from $C_2$ to $z$ is represented by "$a$," then the mathematical relationships which exist pertaining to the location of point $z$ are:

$$b = \frac{R_2(C_1C_2)}{R_1 + R_2} \qquad (2)$$

or $$b = \frac{\pm R_2(R_1 - R_2 - t)}{R_1 + R_2} \qquad (3)$$

wherein $b$ is positive for related lenses of more negative power than the reference lens and $b$ is negative for related lenses of more positive power than the reference lens, and $$a = \frac{Ib \sin m}{\sin z} \qquad (4)$$

wherein $I$ represents the index of refraction of the lens medium. $I$ has been given the value of 1.5232 of conventional ophthalmic glass in accompanying numerical work. There obviously will be other values for plastic and other special lens materials.

The angles $m$ and $z$ can be related through A and B. For a lens more negative than the reference lens, angle $$z = m - (A - B) \qquad (5)$$

and for a lens more positive than the reference lens, angle $$z = m + (A - B) \quad (6)$$

In either case if the angle at $m$ is given it is possible to find B from the relation $$\sin B = \frac{b}{R_2} \sin m \quad (7)$$

and to find A from $$\sin A = I \sin B \quad (8)$$

Thus with the given angle $m$ and the angles A and B, the corresponding angle $z$ can be evaluated for use in evaluating "$a$."

In the formula for "$a$" the angle $z$ is dependent upon the angle $m$ and can be evaluated for any value of the latter. Therefore the value "$a$" is dependent entirely upon the one variable $m$, being the angle that any ray of minimum deviation within the lens body makes with the principal axis of the lens.

"$a$" is obviously a variable. However, since $(A-B)$, the amount by which angle $z$ differs from the angle $m$, being the angle of minimum deviation, is small compared with angle $m$, then the fraction $$\frac{\sin m}{\sin z}$$

in (4) above, will not differ greatly from the value unity, nor vary greatly throughout the range of angle $m$. Therefore the value of "$a$," or the position of $z$ will not vary greatly for the various emergent rays of minimum deviation passed through various zones of the lens.

Now referring to Figure 2, the magnitude of the zone or range $Z_0$ for lenses of various powers and the departure along the principal axis of emergent rays of minimal deviation from the centre of ocular rotation at field angles of 45°, 25° and 5°, is shown for a lens series derived from a minus 1 reference lens having 0.5 D thickness allowance and a rear surface positioned 25.5 mm. from the centre of ocular rotation. The greatest magnitude of the zone $Z_0$ in the series shown is found at the plus 10.00 D lens.

As an example, for a minus 6 D lens of the preferred form having front and rear surface radii of 28.05 mm. and 21.11 mm. respectively, and a vertex thickness of 0.6 mm., the extent of the zone $Z_0$ on the principal axis which includes all the points $z$ up to a field angle of 45° works out to 0.075 mm. It will be clear that the magnitude of this range $Z_0$, in comparison with the range of accuracy in fitting a lens before the eye, is exceedingly small and therefore the extent of the range $Z_0$ may be assumed to be a point which is fixed for all practical purposes. Figure 2 illustrates the manner in which the lens series has been designed to place the range $Z_0$ within which rays of minimal deviation cross the axis so that it embraces the assumed position of the centre of ocular rotation.

The range $Z_0$, small though it is, is still not indicative of the true performance of the lenses of the invention. All rays of minimal deviation approaching the axis at an angle pass closer to the centre of ocular rotation than is indicated by the distance $Z_0$ measured along the axis.

Figure 6:
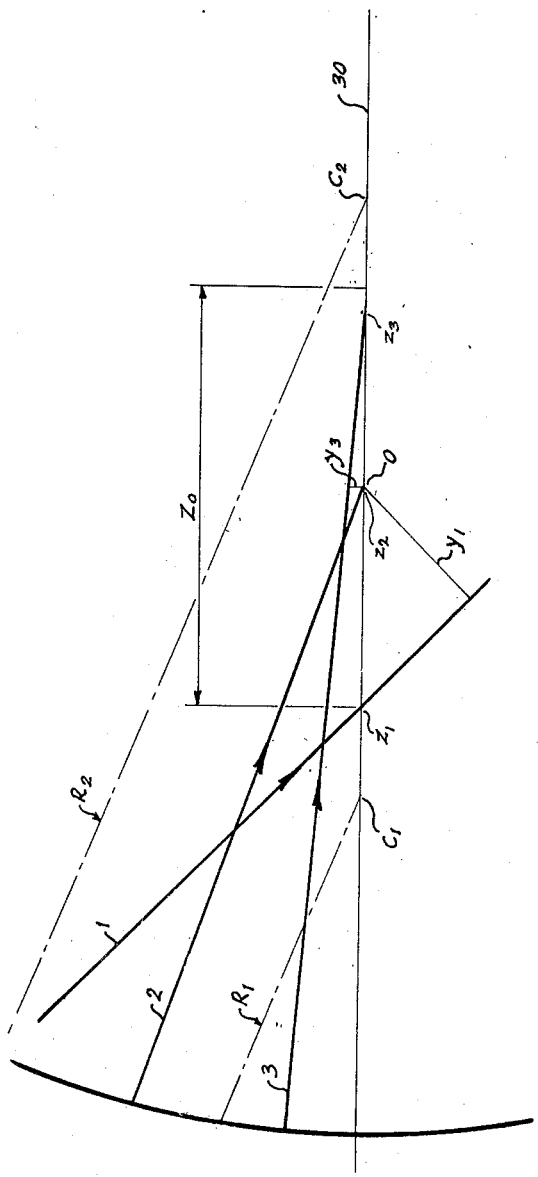
Figure 6 is a diagram illustrating emergent ray departure for various field angles.

Thus in Figure 6 a principal axis 30 has located on it the centres of the arcs of the front and rear surfaces as at $C_1$ and $C_2$. A number of emergent rays indicated as 1, 2 and 3 pass by a path of minimal deviation toward the principal axis to intersect at the points $z_1$, $z_2$ and $z_3$. The apparent departure insofar as the eye is concerned is represented by a line drawn at right angles to each of the rays and extending to intersect the centre of ocular rotation O as indicated by letters $y_1$ and $y_3$.

Apparent departure $y = (zO) \sin z \quad (9)$ where $zO$ represents the distance between the point of intersection of any emergent ray passing to intersect the principal axis in accordance with minimal deviation and the centre of ocular rotation O.

Since the sine function is always less than unity, it will be observed that the value of $y$ will always be less than that of $zO$. It will be apparent from Figure 2 that at some field angle between 25° and 45° the departure curve will lie substantially along the zero line and it is for this reason that ray 2 in Figure 6 is shown passing through the centre of ocular rotation. The principal departure ($zO$) and the apparent departure $y$ in this instance will have value zero. For field angles less than substantially this value, the ray will make a small angle $z$ with the axis, and since the sine values of small angles decrease to zero with the angles, the departures $y$ from the ocular centre will likewise become negligibly small for rays of minimal deviation from the zones of the lens near the vertex.

Thus for the minus 6 lens above discussed, instead of considering the extent of the zone $z$ as a value equivalent to almost 0.1 mm. along the principal axis, this value would be more practically represented by a figure of 0.031 mm. taking into account the sine relation above discussed. In the practical effect, therefore, the emergent sight rays having a path of minimal deviation may be considered as intersecting the principal axis at the point O located at the centre of ocular rotation.

It will be apparent that a lens of the invention may be defined clearly for all practical purposes as having a front and rear surface formed in accordance with a criterion of minimal deviation to direct a sight ray passing through any zone of the lens by a path of minimal deviation toward the principal axis to intersect the latter at a point which, for all practical purposes, coincides with the assumed centre of ocular rotation of the wearer of the lens. It will be clear from an examination of the lens thickness curve in Figure 2 that the rate of change of thickness with change in dioptric power as one examines the lenses throughout a series is a constant. It will be seen in this diagram that the lens thickness varies in a straight-line relation from minus 4.5 D to plus 10 D, the line of change of thickness being on an apparent slope with respect to the line of lens powers. In considering the final lens forms illustrated in Figure 2 such relation holds true from minus 4.5 dioptres to plus 10 dioptres and this portion of the diagram may be considered a series. A second determinate factor to lens thickness comes into play for more minus powers than minus 4.5 in the series shown, namely, that of the minimum thickness necessary for desirable strength characteristics. Nevertheless, the theoretical lens is first determined then the necessary thickness added for practical requirements and then the front surface radius adjusted to obtain the desired effective lens power. In any case, in these more minus powers, as will be evident in the front surface curvature diagram of Figure 2, the change of front surface curvature is constant for the lower minus end of the series. Although in general it is preferable through a series to maintain the front surface curvature constant, particularly by reason of the advantage gained in forming and handling lens glass, nevertheless conditions will arise where it is more practical to maintain the thickness of a consistent value throughout a number of powers.

In defining this invention, it will be readily apparent to skilled persons that in any one series as the form varies travelling from either end of the series toward the reference lens, the centres of front and rear surface curvatures will be located closer together on the principal axis until they are coincident at the reference lens. The emergent sight rays strike the principal axis at all times between the centres of curvature and as above discussed, within a small zone therealong. As the form is varied toward the reference lens along the axis, this zone diminishes in size and it in turn becomes a point coincident with the centres of curvature at the reference lens. This will be evident from Figure 1. It will be clear, therefore, that the emergent rays do not strike the principal axis outside the location of the centres of curvature, that is to say, the section of the principal axis between these centres. It is for this reason that in defining this invention, that the point of intersection of an emergent ray is defined as "being located between the centres of front and rear surface curvatures"; such language embodying the meaning that such point may be coincident with such centres when the latter are themselves coincident, such as in the case of the reference lens. The term "minimal deviation" as previously discussed, may embody the meanings of either minimum deviation or zero deviation, or both, the main factor to be appreciated being that the incident and emergent components of the sight ray make equal angles with the front and rear surfaces of the lens respectively and this condition obtains even in the special case of minimum deviation wherein the front and rear surfaces are concentric and the deviation is zero. Any lens of the invention of any one power from minus 10 dioptres to plus 10 dioptres will have a finished spherical front surface of a radius between 26 and 36 millimeters (see Table III). The lens thickness as a practical minimum will be about 0.6 millimeter but may be 7 millimeters at the vertex or greater depending upon lens form. In any case the minimum will occur at the greater minus lens powers. In this invention it will be appreciated from the foregoing that the rear surface radius is defined by two conditions, (a) the usual condition of the power necessary to give the desired overall lens power in conjunction with the front surface, (b) the radius necessary which, in conjunction with the front surface, directs a sight ray from any zone of the lens by a path of minimal deviation toward the centre of ocular rotation.

The lenses of the present invention will have their edges positioned closer to the face than lenses now in general use and it will therefore be apparent that conventional frames and mountings will not apply. There is, however, a greater field of vision available through the lens and the general deeper curved form will place the lens margins closer to the line of contour of the head avoiding sharply projecting edges and materially reducing possible accidents in use.

When a sphero-cylinder is required, the cylindrical curvature may be placed on the rear surface of the lens. In such a case the front surface curvature will be identical with that in a corresponding lens of spherical power only.

For bifocals a fused segment may be placed at the front of the lens symmetrically in relation to a sight ray transmitted through its centre. A bifocal lens of this character has an advantage of improved lens posture leading to further advantages readily appreciated by skilled persons. The greater protection and unimpeded field of vision afforded by protective goggles and sunglasses constructed according to these proposals will also be quite apparent.

It is intended that the present disclosure should not be construed in any limiting sense other than that indicated by the scope of the following claims.

What I claim as my invention is:

1. A related ophthalmic lens of a lens series defined by a power range extending from about minus 10 dioptres to plus 10 dioptres, wherein all lenses of said series have a rear surface vertex distance from the centre of ocular rotation of the wearer corresponding to a normal wearing distance of a value between 24 and 27 millimeters which is constant for all lenses of said series, said series including a reference lens of a power of about minus 1 dioptre wherein the rear surface radius is equal to said rear surface vertex distance and the front surface thereof is concentric with the rear surface, the vertex thickness and rear surface curvature of each lens of said series down to about minus 4.5 dioptres being formed to provide minimal deviation of a sight ray passing through any zone of the lens, the lenses of the series down to about minus 4.5 dioptres having a constant front surface curvature of a radius greater than the distance of the rear surface vertex from the centre of ocular rotation, the lenses of said series of more minus power than about minus 4.5 having a constant vertex thickness and having both front and rear surface curvatures formed to provide minimal deviation of any sight ray.

2. An ophthalmic lens as claimed in claim 1 wherein the emergent sight ray of minimal deviation intersects the principal axis at a point within a section of said axis the terminal ends of which are defined by the centres of curvature of the front and rear surfaces.

3. A related ophthalmic lens designed in accordance with a criterion of minimal deviation and being of a lens series which may extend from minus 10 dioptres to plus 10 dioptres and having a form derived from a reference lens of the concentric type and a power of about minus 1 dioptre: any related lens of said series of a power greater or less than the power of the reference lens being defined by a front surface curvature equal to the front surface curvature of the reference lens and of a constant value from about minus 4.5 dioptre lens power to plus 10 dioptres, the rear surface being formed to provide minimal deviation of any sight ray passing through the lens such that all such sight rays strike the principal axis of the lens within a departure zone positioned between the centres of curvature of the front and rear surfaces, and which embraces the assumed centre of ocular rotation of the wearer, said front and rear surface curvatures both being varied in accordance with a criterion of minimum deviation at greater minus powers but when both are varied the vertex thickness of the lens remaining a constant value, being substantially the minimum practical thickness desired.

4. An ophthalmic lens designed in accordance with a criterion of minimal deviation of a sight ray passing through any zone thereof from a point of regard to intersect the principal axis of the lens substantially at the centre of ocular rotation and of any chosen vertex power of a value between minus 10 dioptres to plus 10 dioptres and comprising: a finished spherical convex front surface radius of about 27 millimeters, a rear surface spaced from said front surface a distance greater than 0.5 millimeter at the vertex and of a radius of a value between 18 and 50 millimeters and of lesser radius than the radius of the front surface for minus powers and which in conjunction with the radius of the front surface provides minimal deviation of any sight ray passing through any zone of the lens such that all such sight rays strike the principal axis of the lens within a departure zone positioned between the centres of curvature of the front and rear surfaces.

5. An ophthalmic lens designed in accordance with a criterion of minimal deviation of a sight ray passing through any zone thereof from a point of regard to intersect the principal axis of the lens substantially at the centre of ocular rotation and comprising: a finished spherical front surface of about plus 19 dioptres, and a rear surface and lens thickness which for a vertex lens power of plus 10 dioptres have values of about minus 11 dioptres and 6 millimeters respectively, and for a vertex lens power of minus 4.5 dioptres are about minus 24 dioptres and 0.6 millimeter respectively, and which vary uniformly at least between said powers.

6. An ophthalmic lens as claimed in claim 5, in which the lens thickness is about 0.6 millimeter regardless of lens power and the front surface and rear surface for a vertex power of about minus 4.5 dioptres are about plus 19 dioptres and minus 24 dioptres respectively, and for a vertex power of about minus 10 dioptres are about plus 18 dioptres and minus 28 dioptres respectively.

7. A related ophthalmic lens as claimed in claim 3 wherein the distance of the rear surface vertex of the lens to the assumed centre of ocular rotation is a value between 24 and 27 millimeters and the lens thickness at the vertex is greater than 0.5 millimeter.

8. A related ophthalmic lens as claimed in claim 3, wherein the radius of front surface curvature is in all cases greater than the distance from the rear surface vertex to the assumed centre of ocular rotation, the distance of the rear surface vertex of the lens to the assumed centre of ocular rotation is of a value between 24 and 27 millimeters, and the lens thickness at the vertex is greater than 0.5 millimeter.

9. A related ophthalmic lens as claimed in claim 3, wherein the radius of front surface curvature is in all cases greater than the distance from the rear surface vertex to the assumed centre of ocular rotation, the distance of the rear surface vertex of the lens to the assumed centre of ocular rotation is of a value between 24 and 27 millimeters, and the lens thickness at the vertex is greater than 0.5 millimeter, said rear surface having a radius between 18 and 50 millimeters and of a lesser radius than the radius of the front surface for minus lens powers at least.

10. A related ophthalmic lens of a lens series derived from a reference lens of concentric form wherein the said concentric lens has a rear surface curvature of a radius determined by the wearing distance of the lens from the eye and equal to the distance from the centre of ocular rotation to the rear surface vertex, and a vertex thickness of predetermined value, said related lens comprising: a finished spherical front surface of a radius not less than the front surface radius of said concentric reference lens, a thickness determined by the condition that the ratio of change in thickness to the change of effective dioptric power throughout the lens series is equal to a constant, and the rear surface being of a radius which in conjunction with said front surface and lens thickness gives the said effective power, to define a lens body in which the front and rear surfaces of any elementary zone thereof make equal angles with incident and emergent components of a sight ray passing therethrough to obtain minimal deviation thereof.

11. A related ophthalmic lens as claimed in claim 10 wherein the lens thickness is determined by the further condition that it be of a dimension sufficient for desirable structural rigidity, the said dimension being in excess of the computed thickness, and wherein the said front surface radius is modified to a value which in conjunction with the rear surface radius and modified lens thickness gives the said effective power.

12. An ophthalmic lens of an effective lens power between minus 10 dioptres and plus 10 dioptres, comprising in combination, a lens body defined by a finished front surface and a finished rear surface wherein the front and rear surfaces of any elementary zone of said body make equal angles respectively with incident and emergent components of a "sight ray" passing therethrough to obtain "minimal deviation" thereof, so that when said lens body is disposed a predetermined normal wearing distance from the centre of ocular rotation said emergent component of said "sight ray" intersects the principal axis of the lens immediate the centre of ocular rotation, the distance from the rear surface vertex at the said principal axis to the centre of ocular rotation being of a value between 24 and 27 millimeters, the radius of curvature of the front surface being greater than the said distance.

13. An ophthalmic lens comprising in combination: a lens body defined by a finished front surface and a finished rear surface wherein the front and rear surfaces of any elementary zone of said body make equal angles respectively with incident and emergent components of a "sight ray" passing through said zone to obtain "minimal deviation" of the said "sight ray" so that when said lens body is disposed a predetermined normal wearing distance of a value selected from the range 24 to 27 millimeters from the rear surface vertex to the centre of ocular rotation, said emergent component of said "sight ray" intersects the principal axis of the lens at a point less than 0.5 millimeter from the centre of ocular rotation.

GEORGE BATES WOOTTEN.

REFERENCES CITED

The following references are of record in the file of this patent:

UNITED STATES PATENTS

| Number | Name | Date |
| --- | --- | --- |
| 2,021,778 | Hammon | Nov. 19, 1935 |

FOREIGN PATENTS

| Number | Country | Date |
| --- | --- | --- |
| 466,620 | Great Britain | June 1, 1937 |